3,284,351
WATER PURIFICATION METHOD

Mahmoud T. Dajani, Park Forest, and Ralph B. Thompson, Hinsdale, Ill., assignors to Nalco Chemical Company, Chicago, Ill., a corporation of Delaware
No Drawing. Filed July 15, 1963, Ser. No. 295,238
15 Claims. (Cl. 210—63)

The instant invention relates to a method of purifying water. More specifically, the present invention is concerned with a process of purifying iron-bearing waters intended for consumer use, and, in particular, with removing the iron constituents from such water. As a specific embodiment, the invention relates to a water purification method whereby the above process of removal of iron substances from impure water is followed by a subsequent water softening step.

Much of the water intended for consumer use is first purified by contact with ion exchange resins whereby the water is softened. That is, hardness-causing constituents such as magnesium, calcium, etc., are removed. Such water softening treatments are generally carried out in home units, and sometimes by municipalities.

Certain difficulties arise, however, in such softening treatments, particularly with respect to water containing iron constituents. The iron occurring in such iron-bearing natural waters exists in various ionic or molecular forms such as ferrous or divalent ionic iron, ferric or trivalent ionic iron, and colloidal ferric hydroxide or other iron precipitates. The presence of this iron in domestic water sources and particularly in ferrous ion form presents serious ancillary problems to water softening treatments, even in extremely low iron concentrations. The ferric ions may be removed from the iron-bearing water in some precipitant form and the already existent colloidal ferric hydroxide precipitate likewise taken out by various techniques, as by filtration on a porous filter bed. However, ferrous ion in that specific ionic state cannot generally be so precipitated and filtered off. Thus, such ferrous ions pass through filtration media and remain as a water contaminant.

Later, the ferrous ions are slowly oxidized by air and/or other oxidizing substances in the water to ferric ions which in turn form precipitates such as ferric hydroxide. The latter cause various deleterious effects upon ion exchange resins used to soften the water for home use. For example, colloidal ferric hydroxide coagulates upon the resin, forming large particles which are held near the top of the resin bed due to the filtration properties of the bed of resin beads. A gradual accumulation of such colloidal ferric hydroxide particles occurs until the whole bed is saturated. After a time the colloidal ferric hydroxide leaves the bottom of the bed with the softened effluent and subsequently stains home fixtures, clothes, etc. Also, ferrous ion may be oxidized directly on the resin and precipitate upon the exchange sites. This results in uneconomical capacity losses, physical deterioration of the resin, and frequent resin replacement and/or regeneration.

It would therefore be a benefit to the art if a method could be devised to simultaneously remove all forms of the various iron constituents contained in impure iron-bearing waters. Particularly, it would be an advantage if ferrous ions in iron-bearing waters could somehow be extracted from the water so that their subsequent oxidation to ferric ions and formation of undesirable colloidal ferric hydroxides could be obviated. As discussed above, such phenomena, if unimpeded, generally cause serious resin fouling and deterioration in water softening processes. If a method were discovered whereby such ferrous ions along with other forms of iron could be simultaneously removed whereby a pre-purified substantially iron-free water were obtained, such a method would find ready acceptance in the art, particularly with respect to waters being subsequently softened for home use by means of ion exchange resins. The substantially iron-free water would not then cause the above mentioned problems normally occurring with iron-bearing waters, even with those impure waters containing as little as 0.1 p.p.m. of iron in various ionic or molecular forms.

In view of the above it becomes an object of the invention to provide a simple, economical method of purifying water.

A specific object of the invention is to remove iron from iron-bearing waters, and particularly from those waters intended for subsequent consumer use.

Yet another object of the invention is to provide a method of purifying iron-bearing water by first removing iron constituents from such water, and following such pre-purification step with a water softening step involving ion exchange technology.

Other objects will appear hereinafter.

In accordance with the invention a method has been discovered of purifying iron-bearing waters which are to be used by the individual consumer for such purposes as drinking, washing, etc., in which substantially iron-free water is desired. In its broadest aspects the invention comprises the steps of contacting impure iron-bearing waters which contain at least ferrous ions as a contaminant, with a metal phthalocyanine catalyst in presence of an oxidizing agent whereby the ferrous ions are oxidized to ferric ions. The thus oxidized ferrous ions are then removed from the water by various techniques in form of subsequently produced water-insoluble ferric precipitates. Such iron-bearing waters generally contain, in addition to ferrous ions, ferric iron species in form of colloidally dispersed ferric precipitates, etc. These existing colloidal precipitates, along with the newly induced precipitate of previously oxidized ferrous ions are also extracted from the water. This operation may be effected, for example, by removing the total of the water-insoluble precipitates by filtration means. Normally the initial already existent ferric ions and subsequently produced ferric ions are removed in the form of a water-insoluble precipitate of ferric hydroxide by various filtration means subsequent to the contact of the iron-bearing waters with the metal phthalocyanine catalyst. Most preferably, the ferric hydroxide precipitates are caught on a bed of finely divided particulate matter which serves as a filter medium, thereby trapping the total amount of precipitate which is adsorbed on or occluded by the filter bed.

In a specific embodiment the above purification step is combined with a subsequent water softening step. The latter step is measurably improved due to the fact that the relatively impure iron-bearing water has been purified to a substantially iron-free state. This pre-purified water is then contacted with an ion exchange resin and preferably with a cation exchange resin in the sodium form to remove hardness causing constituents such as magnesium, calcium ions, etc.

Heretofore, the softening of such iron-bearing waters led to many problems as generally discussed above. Particularly, accumulation of colloidal ferric hydroxide upon the resin bed occurred, followed by leakage of this precipitate from the saturated bed, whereupon iron staining of home fixtures, clothes, etc. resulted. In addition, the ferrous ions which were not previously removed were oxidized and precipitated on the exchange sites resulting in capacity losses and physical deterioration of the resin. Also, the unstable ferrous ions, were slowly oxidized to ferric ions, thereby forming a colloidal ferric hydroxide precipitate, which had a tendency to severely foul water-softening resins, and greatly reduce their efficiency. In the instant invention, since substantially all iron is first removed from the water to be softened, regardless of its previous particular ionic or molecular iron form, such deleterious effects no longer occur.

The invention specifically relates to a convenient and rapid method of oxidizing ferrous ions to ferric ions which then form removable water-insoluble precipitates such as ferric hydroxide. While in the past ferric ions (in precipitate form) could be removed from iron-bearing waters by conventional filtration methods, ferrous ions, begin only slowly oxidized by such oxidizing agents as air, passed through the filter media along with the water. The ferrous ions were subsequently slowly oxidized to ferric ions colloidal which hydrolyze to ferric precipitates causing the above-mentioned problems. The instant invention obviates such problems by providing a method of rapidly oxidizing ferrous ions to ferric ions and simultaneously or subsequently removing substantially all forms of iron as water-insoluble precipitates. Waters containing as little as 0.1. p.p.m. of ferrous ion concentration may cause consumer use problems, particularly with respect to impure waters which are to be softened. Iron-bearing waters may contain as much as 50 p.p.m. or even 100 p.p.m. of ferrous ions. Generally, however, naturally occurring iron-bearing waters contain from about 0.1 to about 20 p.p.m. of ferrous ions. The instant invention can be carried out whereby all such iron-bearing waters which have varying iron levels can be purified by oxidation of the ferrous ions to ferric ions. These created ferric ions and already existent ferric ions are then removed in form of water-insoluble precipitates.

It has been determined that generally from about 1 to 1000 parts of metal phthalocyanine catalysts per million parts of iron-bearing waters should be present to effect most efficient results. The amount of catalyst employed generally depends upon the amount of ferrous ions present in the impure iron-bearing waters. Usually, from about 1 to about 500 p.p.m. of metal phthalocyanine catalyst is sufficient to quickly effect complete oxidation of the ferrous ions. By proper adjustment of amount of catalyst in relation to ferrous iron present, at last 75% and more preferably 80% or higher of the original total iron may be extracted from impure iron-bearing waters.

The process of the invention may be carried out by a wide variety of specific techniques. For example, the phthalocyanine metal catalyst may be added along with an oxidizing agent to the iron-bearing waters containing ferrous ions, and the thus oxidized ferrous ions removed from the water by subsequent filtration in colloidal or other dispersed ferric precipitates. In another embodiment, the metal phthalocyanine catalyst itself may act as a filter medium whereby the iron precipitates are caught on a bed of the catalyst. However, for reasons of economy and best efficiency it is greatly preferred that the metal phthalocyanine catalyst prior to use, be first added to and adsorbed upon a solid carrier. The thus impregnated solid carrier or composite of carrier and catalyst acts both as a filter media bed as well as a catalytic substance. Thus, in conjunction with a source of oxidizing agent, ferrous ions are rapidly and efficiently oxidized as well as simultaneously removed in form of water-insoluble precipitates and generally as ferric hydroxide.

In order to practice the invention the primary essential is to contact the iron-bearing water in presence of some oxidizing agent and phthalocyanine catalyst to thereby effect oxidation of the ferrous ions. This may be carried out in one embodiment by adding the catalyst directly to the water either as a solution or in its solid form. In such cases, it is preferred that a water-soluble catalyst be employed in order to attain catalyst solubilization and intimate contact of the catalyst and ferrous ions contained in the iron-bearing water. The catalyst remains in the water and is later removed. However, a more preferred method is to slurry a water-insoluble catalyst with the iron-bearing water whereby the catalyst, once it has performed its desired role of promoting oxidation, may be easily withdrawn from the water, such as by merely allowing it to settle out. In still another embodiment a bed of catalyst may be employed whereby the iron-bearing water is allowed to flow either in an upward or downward direction through the bed of catalyst. Air or another oxidizing agent may be added to the treating zone or previously commingled with the iron-bearing water to be purified.

By far the most preferable method with respect to efficiency in optimizing simultaneous ferrous ion oxidation and iron precipitate removal is to employ the phthalocyanine catalyst as a solid composite comprising a carrier and catalyst. Again, the water to be purified is passed through the bed in some type of treating zone whereby it contacts the catalyst-carrier composite. Air may be passed concurrently or counter-currently with respect to the water stream in the treating zone or else bubbled into or commingled with the iron-bearing water in some manner prior to its contact with the metal phthalocyanine catalyst-carrier composite. A specific embodiment involves preparation of a column of catalyst-carrier composite wherein a sufficient volume of the top of the column or tube is left unpacked for continuous introduction of air. In this case a tube or opening may be used as a vent from the top of the column to the atmosphere. Thus, air is continually being introduced into the column and dissolved into the stream of water flowing through. The iron-bearing water flows through the zone of the column containing air as an oxidizing agent, just prior to contact with the bed of carrier-catalyst composite. In practice of this method sufficient air oxidizing agent is continually present to carry out efficient ferrous ion oxidation, if used in combination with the catalytic effect of the metal phthalocyanine catalyst. This bed or column of composite thus simultaneously oxidizes and entraps the formed iron precipitates such as ferric hydroxide. The column may be frequently back-washed with water to periodically free the composite bed from entrained precipitate.

The particular metal phthalocyanine catalyst employed in the invention may be chosen from a wide variety of well-known substances. Particularly preferred metal phthalocyanine catalysts include ferric phthalocyanine, copper phthalocyanine, cobalt phthalocyanine, nickel phthalocyanine, vanadium phthalocyanine, manganese phythalocyanine, etc. Such above metal phthalocyanines are generally not soluble in water. When water-soluble metal phthalocyanines are desired, derivatives of the above must generally be prepared. For example, sulfonated or carboxylated phthalocyanine derivatives of any of the above or other metal phthalocyanine catalysts may be synthesized and are equally useful in the practices of the invention. Sulfonated derivatives may be conveniently obtained by reaction of a metal phthalocyanine such as cobalt or vanadium phthalocyanine with concentrated fuming sulfuric acid. On the other hand, the carboxylated derivatives may be prepared by reacting trichloroacetic acid with the metal phthalocyanine or else by reaction of phosgene and aluminum chloride with a metal phthalocyanine. The acid chloride formed in these reactions is then converted to the carboxylated derivative by known hydrolysis methods. Still other metal phthalocyanine catalysts may be equally employed such as chlorinated copper phthalocyanine as well as other halogenated metal phthalocyanines. Another phthalocyanine derivative useful as a catalyst is a polymeric metal phthalocyanine prepared according to the method disclosed in J. Am. Chem. Soc., 1958, 1197. Other phthalocyanine catalysts useful in the invention may be found by reference to Lubs "The Chemistry of Synthetic Dyes and Pigments," ACS Monograph Series No. 127, Reinhold Publishing Corporation, 1955, and Moser and Thomas, "Phthalocyanine Compounds," ASCS Monograph Series No. 157, Reinhold Publishing Corporation, 1963.

Water-insoluble metal phthalocyanine catalysts are preferred when a solid carrier is conjointly employed since these catalytic substances, when precipitated upon a carrier are more strongly affixed thereto. Such composites are thus less affected by other chemical substances which may be contained in the iron-bearing waters and which may leach out or react with the catalyst if it is of a more water-soluble nature.

As mentioned above, in a greatly preferred embodiment the phthalocyanine catalyst is fixed in an intimate association with a solid carrier whereby a useful composite is made. This composite acts both as a catalyst and a bed of filter media. In addition, the carrier acts as a means of uniformly spreading the active metal phthalocyanine catalyst to thereby enhance its catalytic character in making it more available to the contacted water. A number of various carriers are suitable and may be employed in the practices of the instant invention. For example, carbons such as charcoals as bone char, wood charcoal and the type made from vegetation as cocoanut, nut shells, fruit pits, etc. may be used. Other carriers, synthetically made or naturally-occurring, include silica, alumina, composites of these two materials, molecular sieves, silica gel, coke, etc., and may easily be catalytically impregnated to form effective composites. Preferably, the carriers are previously activated by various treatments of acid, heat, etc. Examples of these are activated alumina, silica and carbon.

Affixing the metal phthalocyanine catalyst or any of its derivatives upon the carrier is accomplished by known methods including dipping, suspending, immersing, etc., the solid particulate carrier in solutions containing phthalocyanine catalyst. Other such means of combining catalyst and carrier may be carried out by spraying, pouring or contacting the carrier and catalyst in any suitable manner. The carrier may be in any particulate form, uniform or irregular, such as spheres, saddles, flakes, pills, pellets, rings, etc. The carrier may be formed into such above shapes after contact with the phthalocyanine catalyst, but it is preferred that the carrier be so formed prior to making the composite. In one embodiment, depending upon solubility characteristics of the particular phthalocyanine catalyst utilized, the catalyst may be first dissolved in water or an organic solvent such as an alcohol, acetone, methyl ethyl ketone, ethanol, dimethyl ether, etc., or in mixtures of the above or like organic solvents in which the metal phthalocyanine catalyst is uniformly solubilized or dispersed. Resultant catalyst solutions or dispersions are then contacted with carrier to synthesize composites. The composite may also be formed prior to contacting the iron-bearing water or, in another embodiment, the composite may be formed in situ by adding the phthalocyanine catalyst and carrier together in the area where the water is to be contacted or to a chamber in which the water is already present.

Generally, in order to affix non-water soluble metal phthalocyanine catalysts upon solid carriers, it is necessary to first solubilize them in concentrated acids such as sulfuric acid. The solid particulate carrier is slurried into the acid solution and mixed thoroughly. The carrier is generally left in contact with the acid catalyst solution for at least one-quarter hour and more preferably from one-quarter to ten hours. After this contact period the acid solution is diluted with deionized water whereupon the phthalocyanine precipitates upon the carrier until carrier surface sites are satisfied. The remainder of the metal phthalocyanine precipitates from the solution and can be thus reused. It has been estimated that in employing a 1% acid solution of metal phthalocyanine catalyst generally 0.01% of phthalocyanine by weight are deposited based on carrier weight. With respect to water-soluble phthalocyanine catalysts it is only necessary to prepare dilute catalyst solutions, for example, a 1% solution, and slurry the carrier therein. The carrier is left for about one hour, filtered from the solution and then rinsed.

Any suitable oxidizing agent may be used to rapidly oxidize the ferrous ions contained in the iron-bearing water when such oxidation is catalytically induced by the metal phthalocyanine catalyst. For example, alkali metal, alkaline earth metal or ammonium perchlorates or permanganates, manganese oxide, halogens such as chlorine or bromine, oxygen or a substance containing oxygen such as air, peroxy producing substances such as sodium peroxide, hydrogen peroxide, etc., may be used. The most preferred substance by virtue of its availability and low cost is oxygen, and particularly air containing oxygen. The oxidizing substance may be introduced into the iron-bearing water, or the water itself may contain dissolved amounts of such oxidizing agents as naturally occurring substances. For example, air may be introduced into the iron-bearing waters or such waters may contain sufficient dissolved air to fully oxidize the ferrous ions contained therein. Generally, it is preferred to add air to the iron-bearing water just prior to or during the oxidizing treatment.

The following examples illustrate typical metal phthalocyanine catalysts or derivatives of same, catalyst composites, and methods of their preparation.

*Example I*

A 1% solution of sulfonated cobalt phthalocyanine in deionized water was first prepared by prior art techniques. To this was added a solid granular form of charcoal. During an equilibrium period of about one hour the water-soluble phthalocyanine, having a high affinity for a solid surface was strongly adsorbed on the surface of the charcoal. The newly formed composite was filtered, washed with water and thereafter dried.

The same method was employed in preparing a composite of a sulfonated cobalt phthalocyanine catalyst upon an activated alumina carrier.

*Example II*

A 1% acid solution of copper phthalocyanine was made by addition to 95% concentrated sulfuric acid. To this was added solid activated charcoal in particulate form which was mixed thoroughly in the acid phthalocyanine solution for 15 minutes to allow equilibrium to occur. Water was then slowly added to dilute the acid and thereby precipitate the phthalocyanine on the solid activated charcoal surface. Further rinsing the filtered carrier with water removed excess acid and phthalocyanine. Lastly, the impregnated solid composite was dried in air.

The above technique was also used in impregnating both activated alumina and activated charcoal with chlorinated copper phthalocyanine.

*Example III*

An iron phthalocyanine catalyst was prepared by reacting one mole of ferrous sulfate with one mole of metal free phthalocyanine in boiling quinoline for three hours. The reaction product was cooled, filtered, and rinsed with water containing ammonium hydroxide to remove any unreacted ferrous sulfate. This was then followed by an acetone rinse and drying step. The purple solid product was soluble in concentrated sulfuric acid and used to impregnate activated charcoal, other carbonaceous materials and activated alumina by the technique discussed in Example II above.

*Example IV*

A polymeric phthalocyanine was prepared in the following manner. Pyromellitic acid, phthalic anhydride, urea and cuprous chloride were reacted with catalytic amounts of ammonium molybdate at 200° C. for several hours. This was then followed by successive washings and filtrations of the resultant solid with boiling water, hydrochloric acid, and ammonium hydroxide. The polymer, soluble in dimethylformamide, was separated from dimethylformamide-insoluble monomeric copper phthalocyanine by filtering the latter from a slurry of the reaction product in dimethylformamide, followed by precipitation with chloroform of the polymer from the filtrate. This polymer was then in turn made up in composite form with various carriers.

In order to determine the efficacy of the invention in oxidizing ferrous ions in iron-bearing waters, the following procedure was devised:

A five-gallon reservoir, equipped with a dispersion tube for nitrogen blanketing, was filled with deionized water containing sufficient ferrous sulfate to give about 10 p.p.m. ferrous solution. This makeup feedwater had a pH of 4.9 and continuous nitrogen blanketing kept the iron in the ferrous state. A ¼" x ⅟₁₆" Tygon tubing extended from the reservoir to a Lucite column (11" x 1.25") where a solid carrier impregnated with catalyst was located. A space (3" x 1.25") was left vacant at the top of the column to provide air as an oxidizing agent. When the feedwater flowed into the column, it contacted the air prior to the catalyst bed. A screw-type clamp controlled the flow rate which was kept at a measured 2–4 g.p.m./ft.$^2$. When the pressure dropped across the column due to accumulation of precipitated $Fe(OH)_3$, the column was backwashed with deionized water for a few minutes to restore the flow rate. Samples of the effluent and influent were taken at equal intervals and analyzed for total iron. The analytical procedure used was a colorimetric test for iron run according to the general procedure set forth in J. Am. Chem. Soc. 49, p. 1916 (1927).

In one experiment 12 x 40 mesh activated carbon was impregnated with sulfonated cobalt phthalocyanine, and its activity in oxidizing ferrous ion compared to the same untreated activated carbon by employment of the just discussed test apparatus. The water, containing 10 p.p.m. of iron in ferrous form, passed through both the untreated carbon bed and the carbon carrier impregnated with sulfonated cobalt phthalocyanine at a rate of 75 ml./min. (2.3 g.p.m./ft.$^2$). The results in Table I below indicate the clear superiority of the carrier impregnated with the metal phthalocyanine catalyst in promoting ferrous ion oxidation and removal (Filter Bed #2) over that of the blank or untreated activated carbon (Filter Bed #1).

TABLE I

| Time Min. | Percent Iron Removed | |
|---|---|---|
| | Filter Bed #1 | Filter Bed #2 |
| 15 | 98 | 100 |
| 30 | 98 | 100 |
| 55 | 75 | 97 |
| 75 | 60 | 97 |
| 90 | 40 | 96 |
| 110 | 35 | 91 |
| 125 | 30 | 87 |
| 143 | 30 | 87 |
| Backwash Columns for 10 minutes | | |
| 153 | 94 | 100 |
| 170 | 72 | 96 |
| 190 | 60 | 89 |

Another study was carried out in which the test unit employed was of a cyclic type. A feedwater saturated with air and containing about 8 p.p.m. of iron in ferrous form was introduced into two Lucite columns, 27" x 1¼", one containing a bed of activated carbon impregnated with copper phthalocyanine, and the other catalyst free activated carbon. The filter beds themselves had dimensions of 18" x 1.25". The makeup water was fed into the columns through a centrifugal pump equipped with a by-pass. Flow to the columns was controlled with a flow meter at 10 g.p.m./ft.$^2$ or about 340 ml./min. The effluent from the bottom of the column went to drain through a solenoid valve. The backwash cycle, when necessary, involved back-flow of water lasting for 10 minutes. This freed the catalyst bed of entrained ferric hydroxide. Table II below shows the results of ferrous ion oxidation by activated carbon impregnated with copper phthalocyanine in comparison to activity of the activated carbon alone. In each case air which first contacted the feed water in the reservoir was the oxidizing agent. The results clearly indicate that the total iron-removing activity of the catalyst-impregnated activated carbon bed (column 2) was clearly superior to use of a carrier alone (column 1), which acted primarily as a filter media. It is to be noted that at least 80% of iron was removed from the water through use of the catalytic bed over the 4 day trial period. It is a primary essential for good oxidation therefore that the metal phthalocyanine catalyst be present to catalyze the ferrous oxidation reaction. The same excellent performance was noted with a bed of iron phthalocyanine impregnated upon activated carbon.

TABLE II

| Time (hours) | Percent Iron Removed | |
|---|---|---|
| | Column 1 | Column 2 |
| 5 | 100 | 99 |
| 10 | 95 | 98 |
| 26* | 86 | 94 |
| 31 | 80 | 84 |
| 36 | 82 | 87 |
| 41* | 77 | 87 |
| 45 | 58 | 84 |
| 48 | 56 | 82 |

*Backwash for 10 minutes.

The above examples show the surprising activity of the phthalocyanine catalyst in promoting oxidation of ferrous ions. These examples are, of course, not meant to be a limitation upon the process of the invention. The oxidation of the ferrous ions may be equally carried out through use of other phthalocyanine catalysts and without carrier support. The thus oxidized ferric hydroxide is then caught either on the catalyst or upon a filter bed designed to catch existent precipitates along with those precipitates created by oxidative contact of the iron-bearing water with phthalocyanine catalyst.

The iron-bearing water may be treated with phthalocyanine catalysts in the presence of one or more oxidizing agents either at ambient or elevated temperatures. Such temperatures may range as high as 300° F. Likewise, both atmospheric and superatmospheric pressures may be employed, as high as, for example, 200 p.s.i.g. Excellent results, as seen in the examples above, have been demonstrated at room temperature and under atmospheric pressures.

The invention is hereby claimed as follows:

1. A method of purifying iron-bearing waters intended for consumer use which comprises the steps of contacting said water containing at least ferrous ions, with a metal phthalocyanine catalyst in presence of an oxidizing agent, whereby said ferrous ions are oxidized to ferric ions, and removing the ferric ions from said water as a water-insoluble precipitate.

2. The method of claim 1 wherein 1–1000 parts of said catalyst are present per million parts of said iron-bearing water.

3. The method of claim 1 wherein said ferric ions are removed by filtration means in the form of an insoluble precipitate of ferric hydroxide.

4. The method of claim 3 wherein said ferric hydroxide precipitate is caught on a bed of finely divided particulate matter serving as a filter medium.

5. A method of purifying iron-bearing waters intended for consumer use which comprises the steps of contacting said water containing at least ferrous ions in presence of an oxidizing agent, with a solid carrier impregnated with a metal phthalocyanine catalyst whereby said ferrous ions are oxidized to ferric ions, and removing the ferric ions from said water as a water-insoluble precipitate.

6. A method of purifying iron-bearing waters intended for consumer use which comprises the steps of flowing said water containing at least 0.1 p.p.m. of ferrous ion through a composite bed of a solid carrier impregnated with metal phthalocyanine catalyst, said water additionally containing air as an oxidizing agent, whereby said ferrous ions are oxidized to ferric ions, and removing the ferric ions as a water-insoluble precipitate by adsorption of said precipitate upon said bed.

7. The method of claim 6 wherein 1–1000 parts of said metal phthalocyanine are present per million parts of said iron-bearing water.

8. The method of claim 6 wherein 0.1–20 p.p.m. of ferrous ions are present in said iron-bearing water.

9. The method of claim 6 wherein said composite is activated carbon impregnated with a sulfonated cobalt phthalocyanine catalyst.

10. The method of claim 6 wherein said composite is activated carbon impregnated with a copper phthalocyanine catalyst.

11. The method of claim 6 wherein said composite is activated carbon impregnated with an iron phthalocyanine catalyst.

12. A method of purifying iron-bearing waters intended for consumer use which comprises the steps of contacting said water containing colloidal ferric precipitate and ferrous ions with sufficient metal phthalocyanine catalyst in presence of an oxidizing agent whereby said ferrous ions are oxidized to ferric ions, and removing both thus oxidized ferrous ions in form of a water-insoluble ferric precipitate and initially occurring colloidal ferric precipitate, whereby at least 75% of total iron is removed from said iron-bearing water.

13. A method of purifying iron-bearing waters intended for consumer use which comprises the steps of flowing said water containing colloidal ferric hydroxide precipitate and ferrous ions through a bed of solid carrier impregnated with a metal phthalocyanine catalyst, and in presence of air as an oxidizing agent oxidizing said ferrous ions, and removing both thus oxidized ferrous ions and initial colloidal ferric hydroxide precipitate as a water-insoluble precipitate of ferric hydroxide by adsorption of said precipitate upon said bed, whereby at least 75% of total iron is removed from said iron-bearing water.

14. A method of purifying iron-bearing waters intended for consumer use and of improving the efficiency of softening said waters which comprises the steps of contacting said water containing at least ferrous ions with a metal phthalocyanine catalyst in presence of an oxidizing agent whereby said ferrous ions are oxidized to ferric ions, removing the ferric ions as a water-insoluble precipitate, and subsequently softening the substantially iron-free water by contact with ion exchange resin, whereby fouling and deterioration of said resin by iron are substantially prevented.

15. A method of purifying iron-bearing waters intended for consumer use and of improving the efficiency of softening said waters which comprises the steps of flowing said water containing at least 0.1 p.p.m. of ferrous ion through a bed of solid carrier impregnated with a metal phthalocyanine catalyst, and in the presence of air as an oxidizing agent, oxidizing said ferrous ions to ferric ions and removing the ferric ions as a water-insoluble precipitate of ferric hydroxide by adsorption of said precipitate upon said bed, and subsequently softening the substantially iron-free water by subsequent contact with a cation exchange resin in sodium form whereby fouling and deterioration of said resin by iron are substantially prevented.

References Cited by the Examiner

UNITED STATES PATENTS

| | | | |
|---|---|---|---|
| 3,029,201 | 4/1962 | Brown et al. | 210—59 |
| 3,078,224 | 2/1963 | Schulze et al. | 210—38 X |

OTHER REFERENCES

Nordell, Water Treatment, Industrial and Other Uses, Copyright 1951 by Reinhold Publishing Co., New York, N.Y., p. 233.

MORRIS O. WOLK, *Primary Examiner.*

JOSEPH SCOVRONEK, *Examiner.*

E. B. WHITBY, *Assistant Examiner.*